(12) United States Patent
Oh et al.

(10) Patent No.: US 8,325,218 B2
(45) Date of Patent: Dec. 4, 2012

(54) COLOR SETTING APPARATUS AND METHOD

(75) Inventors: Sang-Wook Oh, Ansan-si (KR); Sung-Dae Cho, Yongin-si (KR); Young-Min Jeong, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1363 days.

(21) Appl. No.: 11/652,330

(22) Filed: Jan. 11, 2007

(65) Prior Publication Data
US 2007/0188666 A1    Aug. 16, 2007

(30) Foreign Application Priority Data
Jan. 27, 2006    (KR) .................... 10-2006-0008948

(51) Int. Cl.
*H04N 1/60* (2006.01)
(52) U.S. Cl. ......................................................... 348/29
(58) Field of Classification Search .................. 348/29
See application file for complete search history.

(56) References Cited

U.S. PATENT DOCUMENTS

| | | | | |
|---|---|---|---|---|
| 7,116,317 B2* | 10/2006 | Gregorio et al. | ............. | 345/184 |
| 7,405,729 B2* | 7/2008 | Gregorio et al. | ............. | 345/184 |
| 7,589,717 B2* | 9/2009 | Gregorio et al. | ............. | 345/184 |
| 7,751,085 B2* | 7/2010 | Yabe | ............................. | 358/1.9 |

FOREIGN PATENT DOCUMENTS

| | | |
|---|---|---|
| JP | 07-099589 | 4/1995 |
| JP | 13-045527 | 2/2001 |
| KR | 2005-0077209 | 8/2005 |

OTHER PUBLICATIONS

LCD Digital Color TV User Manual, SONY Corporation 2005.*
www.anychart.com, Oct. 13, 2011.*

* cited by examiner

*Primary Examiner* — David Eng
(74) *Attorney, Agent, or Firm* — Cha & Reiter, LLC

(57) ABSTRACT

A color setting apparatus and method for a system for reproducing multimedia data are provided. The apparatus includes a color setting controller for displaying a closed curve band divided into at least two equal-sized sections each containing a different color, and a setting band having at least two sections for indicating change of a set value of each of the colors on a screen, and for changing the set value of a selected color and displaying the changed color according to the changed set value on the screen. The color setting controller increases or decreases the size of the section for indicating change of the set value according to the set value.

12 Claims, 8 Drawing Sheets

COLOR SETTING APPARATUS AND METHOD

CLAIM OF PRIORITY

This application claims the benefit under 35 U.S.C. §119(a) from an application entitled "COLOR SETTING APPARATUS AND METHOD," filed in the Korean Intellectual Property Office on 27 Jan. 2006 and assigned Serial No. 10-2006-0008948, the entire contents of which are incorporated herein by reference.

BACKGROUND OF THE INVENTION

1. Field of the Invention

The present invention relates to a color setting apparatus and method for reproducing multimedia data.

2. Description of the Related Art

Development of multimedia technology has resulted in the introduction of various kinds of multimedia data and the development of image reproduction systems for reproducing, i.e., playing back or presenting, multimedia data.

Representative image reproduction systems for reproducing multimedia data include a digital television, a digital camera, a digital camcorder, a mobile terminal, and so on.

An image reproduction system can reproduce various types of multimedia data in various environments, and the user can often set a color in which the multimedia data is to be played back based on what is suitable within the ambient environment.

For example, when the image reproduction system reproduces multimedia data in an environment where the screen of the image reproduction system is brighter than the ambient light, color of the multimedia data to be played back on the screen of the image reproduction system can be set to faithfully represent what is intended.

If, on the other hand, the image reproduction system plays back multimedia data in an environment where ambient light is brighter than the screen, color of the multimedia data reproduced cannot be faithfully represented and the multimedia data are, as a result, difficult to see.

To resolve this problem, the image reproduction system provides a color setting function for adjusting the color of the screen in dependence upon the ambient environment.

The image reproduction system displays settable colors on the screen, which the user can set or adjust by means of the color setting function.

For example, the image reproduction system may display on-screen, e.g., in bar graph form, a set value (e.g., brightness of color) which is adjustable, and then displays the color corresponding to the adjusted set value while the user sets or adjusts the set value.

The set value displayed in bar graph form has a maximum value and a minimum value for a certain color, and the set value of the currently selected color is displayed together with the bar graph.

However, far more colors can actually be used for reproduction of the multimedia data than can be adjusted using the color setting function.

For example, when the image reproduction system employs a 24-bit RGB color space for reproduction of the multimedia data, 16,777,216 ($=2^8(R) \times 2^8(G) \times 2^8(B)$) colors are usable in reproducing the multimedia data on the display.

However, since the image reproduction system provides the color setting function for only a limited number of colors, the user may not be able to adjust a desired color. Typically, the colors which can be changed by the color setting function are arranged on-screen so that the set value of the color selected from the arrangement can then be adjusted or changed.

SUMMARY OF THE INVENTION

It would desirable to, instead, display, for user selection, the settable colors, and to provide for selection and then change of the set value of the selected color.

It would be further desirable, from the standpoint of user convenience, to avoid having to repeat the entire procedure for each color whose setting is to be adjusted.

The present invention provides a color setting apparatus and method in which selection of a color to be set and adjustment of its set value can be performed simultaneously.

In a first aspect of the present invention, a color setting apparatus includes a color setting controller for displaying a closed curve band divided into at least two equal-sized sections each containing a different color, and a setting band having at least two sections for indicating change of a set value of each of the colors on a screen, and for changing the set value of a selected color and displaying the changed color according to the changed set value on the screen.

The color setting controller may, according to the set value desired, increase or decrease the size of the section for indicating change of the set value.

The setting band may be arranged within the closed curve band.

In a second aspect, a color setting apparatus for a system for reproducing multimedia data includes: a display for displaying a closed curve band divided into at least two equal-sized sections each containing a different color, a setting band having at least two sections for indicating change of a set value of each of the colors, and a reference point for color selection on a screen; and a color setting controller for rotating the closed curve band and the setting band in a requested direction in response to a request for rotating the closed curve band and the setting band, changing the size of a portion of the setting band corresponding to a color located at the reference point in response to a color change request, and displaying the result.

The color setting apparatus may further comprise a key pad which has at least one rotation key for rotating the closed curve band and the setting band and at least one change key for changing the size of a portion of the setting band corresponding to a color requested to be changed.

In a third aspect, a color setting apparatus includes: a display for displaying a closed curve band divided into at least two equal-sized sections each containing a different color, a setting band having at least two sections for indicating change of a set value of each of the colors, and a pointer which is movable on the closed curve band for color selection on a screen; and a color setting controller for moving a location of the pointer to a requested location on the closed curve band in response to a location change request of the pointer, changing the size of a section of the setting band corresponding to the color on the closed curve band at which the pointer is located in response to a color change request, and then displaying the result.

The color setting apparatus may further comprise a key pad which has at least one location change key for changing a location of the pointer on the closed curve band and at least one setting band section change key for changing the size of the section of the setting band corresponding to a color requested to be changed.

In a fourth aspect, a color setting method for a system for reproducing, i.e., replaying, multimedia data, includes: (a)

displaying a closed curve band divided into at least two equal-sized sections each containing a different color, and a setting band having at least two sections for indicating change of a set value of each of the colors on a screen; and (b) changing the set value of the selected color and displaying the changed color according to the changed set value.

Step (b) may comprise increasing or decreasing the size of the section for indicating change of the set value according to the set value and displaying the result.

In a fifth aspect, a color setting method for a system for reproducing multimedia data, includes: displaying a closed curve band divided into at least two equal-sized sections each containing a different color, a setting band having at least two sections for indicating change of a set value of each of the colors, and a reference point for color selection on a screen; rotating the closed curve band and the setting band in a requested direction in response to a request for rotating the closed curve band and the setting band; and changing the size of a portion of the setting band corresponding to a color located at the reference point in response to a color change request and then displaying the result.

In a sixth aspect, a color setting method for a system for reproducing multimedia data involves: displaying a closed curve band divided into at least two equal-sized sections each containing a different color, a setting band having at least two sections for indicating change of a set value of each of the colors, and a pointer which is movable on the closed curve band for color selection on a screen; moving a location of the pointer to a requested location on the closed curve band in response to a location change request of the pointer; and changing the size of a section of the setting band corresponding to the color on the closed curve band at which the pointer is located in response to a color change request and then displaying the result.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF EXEMPLARY EMBODIMENTS

Hereinafter, exemplary embodiments of the present invention are described in detail with reference to the accompanying drawings. The following discussion omits, for conciseness and clarity of presentation, detailed description of known functions and configurations incorporated herein.

Figure 1:
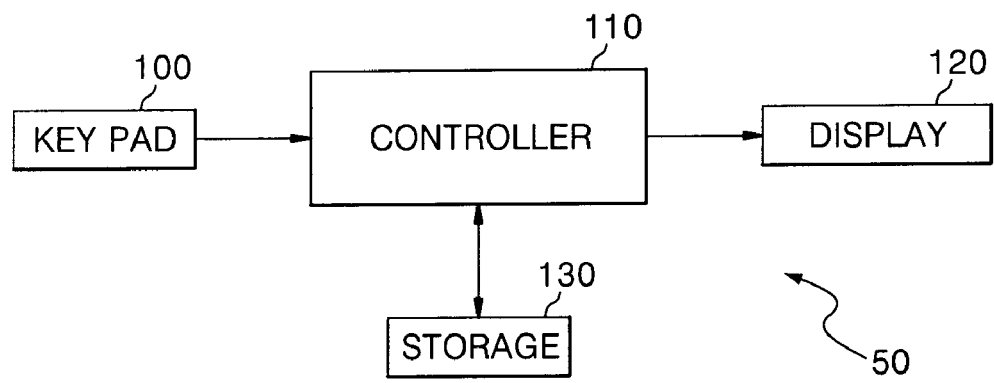
FIG. 1 is a block diagram illustrating a color setting apparatus according to a first exemplary embodiment of the present invention.

FIG. 1 shows an exemplary color setting apparatus 50 according to a first embodiment of the present invention. The color setting apparatus 50 has a key pad 100, a controller 110, a display 120, and a storage unit 130.

The key pad 100 has at least one key, generates a key selection signal when a key is selected, and provides it to the controller 110.

Right, left, up and down directional keys, and an end key for terminating a current operation of the color setting apparatus 50, may be provided.

The controller 110 displays, through the display 120, a color setting interface 300 used for reproduction of the multimedia data at a color setting request.

Figure 3A:
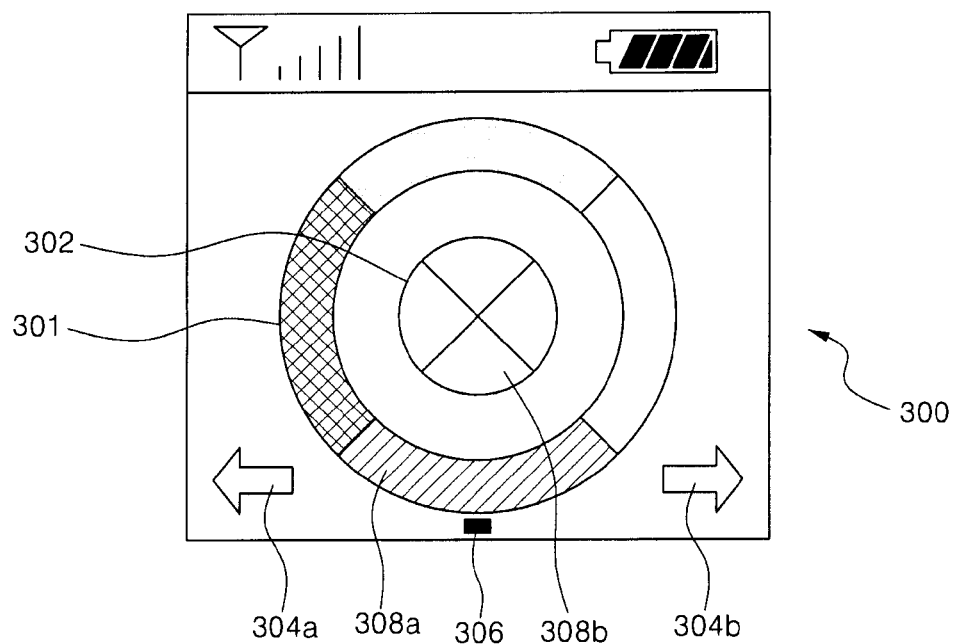
As shown in FIG. 3A, the color setting interface comprises a color circle 301 having at least one changeable color, the different cross-hatchings and other designs in sectors of the circle denoting respective colors. The color setting interface further includes a setting circle 302 arranged in the color circle 301 to indicate change of the color contained in the color circle according to the set value, and left and right arrows 304a. 304b indicating left and right movement directions of the color circle. The setting circle 302 centers on a color setting reference point 306 of the screen of the display 120.

As shown in FIG. 3A, the color setting interface 300 comprises a color circle 301 having at least one changeable color, the different cross-hatchings and other designs in sectors of the circle denoting respective colors. The color setting interface 300 further includes a setting circle 302 arranged in the color circle 301 to indicate change of the color contained in the color circle according to the set value, and left and right arrows 304a. 304b indicating left and right movement directions of the color circle. The setting circle 302 centers on a color setting reference point 306 of the screen of the display 120.

As seen from FIG. 3A, the color circle 301 has four changeable colors. The setting circle 302 shows the initial set values of the four colors, and indicates a change of the corresponding color according to the set value of each of the four colors.

Figure 3B:
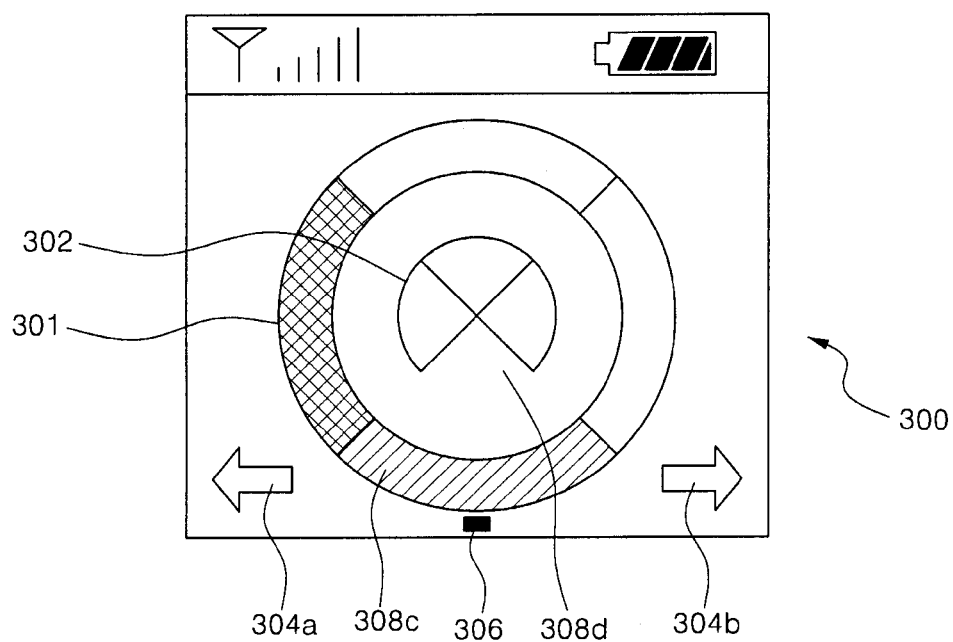
Figure 3C:
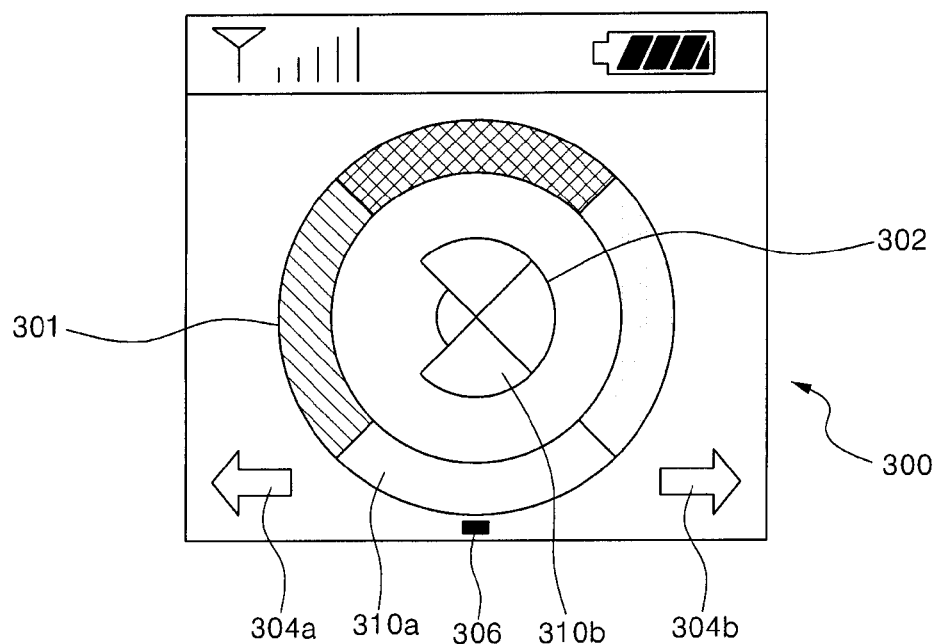
Figure 3D:
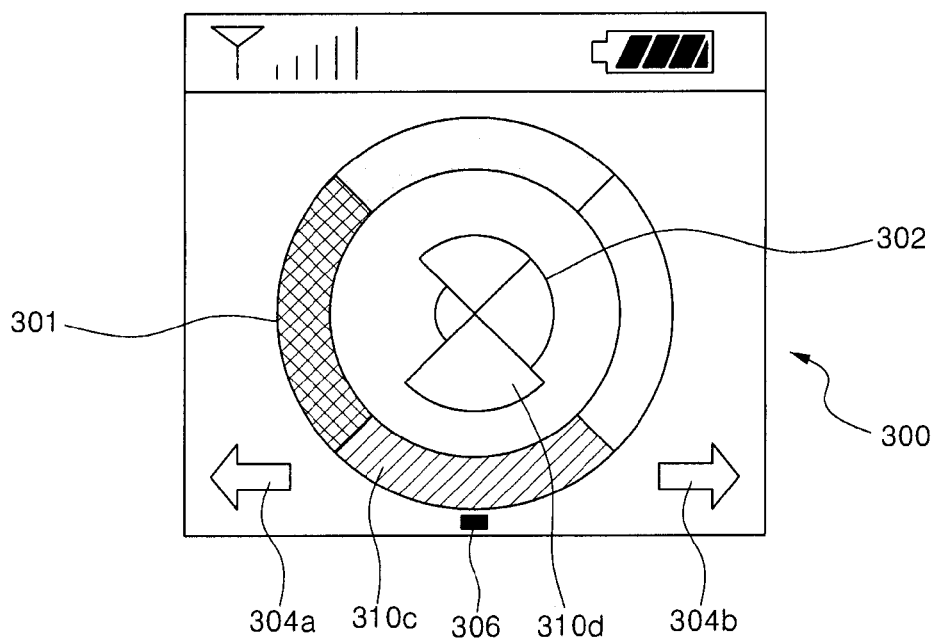

As an example, FIGS. 3A, 3D show, by way of illustrative and non-limitative example, the color setting interface 300 displayed on the screen of the display 120.

FIG. 3A shows four colors, but the number of colors is not so limited.

The controller 110 changes and then displays the set value of the color located at the color setting reference point 306. This is done in response to a key selection signal corresponding to actuation of the up-down directional key on the key pad 100 in a state in which the color setting interface is displayed as shown in FIG. 3A.

In that state, it is preferably the key selection signal corresponding to the up directional key which serves as a signal for reducing the magnitude of the set value of the color located at the color setting reference point 306; conversely, the key selection signal corresponding to the down directional key serves as a signal for increasing the magnitude of the set value of the color located at the color setting reference point 306. The roles of the up and down keys may, however, be reversed in this regard.

FIGS. 3A, 3B collectively demonstrate, operationally, a transition in the color setting interface 300. For example, when the controller 110 decreases a magnitude of the set value for a color 308a by keypad 100 operation, the sector 308b shrinks in size correspondingly to arrive at sector 308d. As this occurs, the color 308a located at the color setting reference point 306 is changed to a color 308c corresponding to the decreased magnitude of the set value.

The controller 110 rotates the color circle 301 and the setting circle 302 in a direction corresponding to each directional key, as a key selection signal corresponding to the right-left directional keys is input from the key pad 100 in a state in which the color setting interface of FIG. 3B is displayed.

The controller 110 changes and then displays the set value of the color located at the color setting reference point 306 according to the key selection signal corresponding to the up-down directional key input from the key pad 100. The change in set value is preferably concurrent with the respective change in color, and they preferably occur continuously. These changes occur in a state in which the color circle 301 and the setting circle 302 have been rotated in a direction corresponding to which of the right-left directional keys is actuated. The up-down adjustment may be held inoperative until the rotating achieves one of the designated, here four, orientations.

The key selection signal corresponding to the left directional key may cause rotation of the color circle 301 and the setting circle 302 counterclockwise, and the key selection signal corresponding to the right directional key may cause rotation of the color circle 301 and the setting circle 302 clockwise.

That is, the controller 110 rotates the color circle 301 and the setting circle 302 counterclockwise by a predetermined angle as the key selection signal corresponding to the left directional key is input from the key pad 100 in a state in which the color setting interface of FIG. 3B is displayed, as shown in FIG. 3C.

Conversely, the controller 110 increases a magnitude of the set value of the color 310a located at the color setting reference point 306 by a predetermined amount as the key selection signal corresponding to the down directional key is input from the key pad 100 in a state in which the color setting interface of FIG. 3C is displayed. The predetermined amount may be, for example, proportional to the amount of time the down directional key is pressed, or may correspond to the number of discrete key actuations. The magnitude change is evidenced by the expansion in sector size, as seen by comparing sectors 310b, 310d in FIGS. 3C, 3D, respectively.

As shown in FIG. 3D, the color located at the color setting reference point 306 is consequently changed to a color 310c corresponding to expanded magnitude of the set value.

The storage 130 stores at least one color set value selected by the user.

Figure 2:
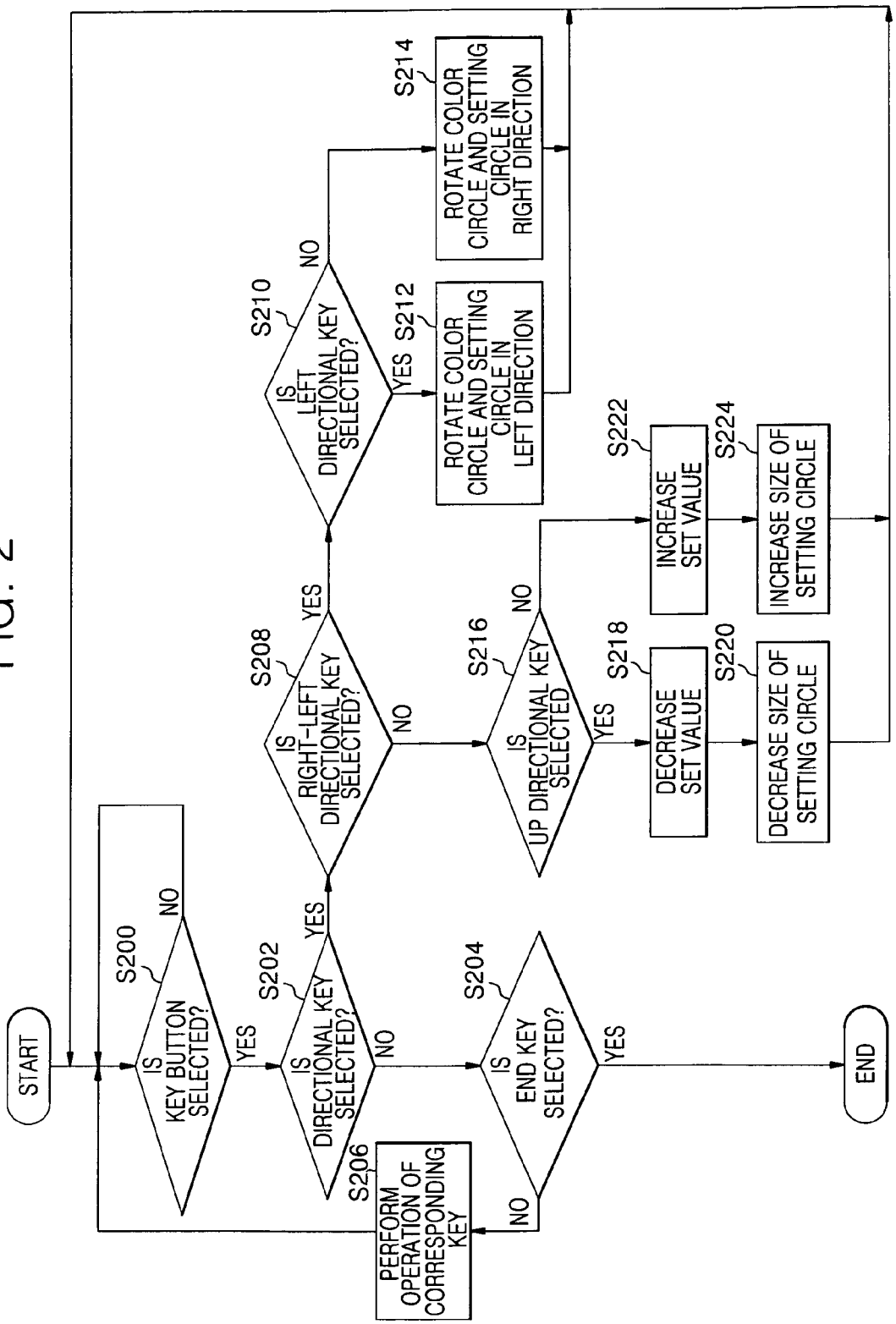
FIG. 2 is a flowchart illustrating a color setting method of the color setting apparatus according to the first exemplary embodiment of the present invention.

FIG. 2 describes a color setting method of the color setting apparatus 50 according to the first embodiment of the present invention.

The color setting apparatus 50 checks whether or not a certain key is selected in a state in which the color setting interface 300 used to reproduce the multimedia data is displayed at a color setting request (S200).

The color setting apparatus checks, when a certain key is selected, whether or not the selected key is the directional key (S202).

A check is made as to whether or not the selected key is the end key, if the selected key is not the directional key (S204).

If the selected key is not the end key, an operation is performed (S206); otherwise, if the selected key is the end key, the current operation is finished.

If the selected key is determined to be the directional key (S202), query is made as to whether the selected key is the right-left directional key (S208).

If the selected key is the left directional key (S210), the color circle and the setting circle are rotated counterclockwise (S212).

When the selected key is not the left directional key, the color circle and the setting circle are rotated clockwise (S214).

If the selected key is determined not to be the right-left directional key, query is made as to whether the selected key is the up directional key (S216).

If it is the up directional key, the set value of the color located at the color setting reference point is decreased by a predetermined magnitude (S218). In addition, the size of the corresponding sector or portion of the setting circle is likewise decreased (S220).

When the selected key is determined not to be the up directional key in step S216, the set value of the color located at the color setting reference point is increased by a predetermined magnitude (S222), and the sector of the setting circle is likewise expanded in size (S224).

Figure 4:
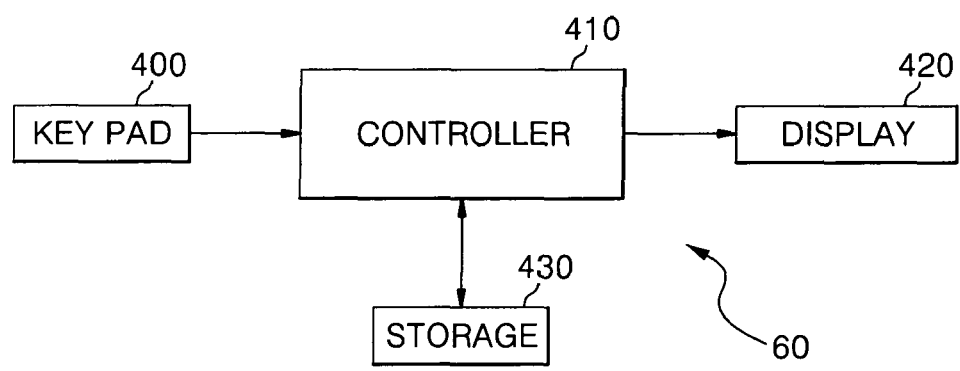
FIG. 4 is a block diagram illustrating a color setting apparatus according to a second exemplary embodiment of the present invention.

FIG. 4 is a block diagram illustrating an exemplary color setting apparatus 60 according to a second embodiment of the present invention.

As in the first embodiment, the color setting apparatus 60 comprises a key pad 400, a controller 410, a display 420, and a storage unit 430. The key pad 400 has at least one key, generates a key selection signal when a key is selected, and provides the key selection signal to the controller 410. Among the keys are right, left, up and down directional keys.

Unlike the first embodiment, the cooler setting apparatus 60 additionally features an end key for terminating a current operation of the color setting apparatus, a pointer moving completion key, and a color setting completion key.

The pointer is described further below.

The controller 410 displays the color setting interface used for reproduction of multimedia data through the display 420 at a color setting request.

Figure 6:
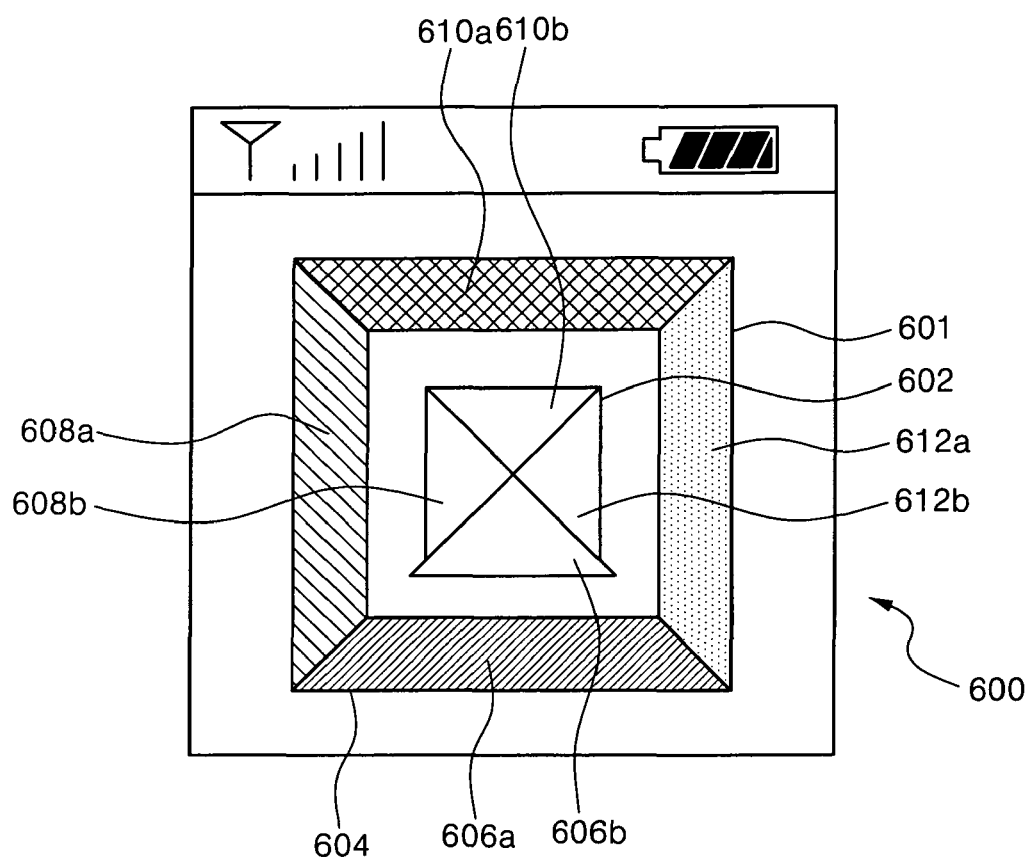
FIG. 6 shows a color setting interface screen used for color setting according to the second exemplary embodiment of the present invention.

As shown in FIG. 6, the color setting interface 600 comprises a color band 601 which contains at least one changeable color for reproduction of the multimedia data, and the sectorized setting magnitude indicator 602 which contains portions or sectors that track and indicate, according to the set value, change in the associated color of the color band 601. In the exemplary configuration seen in FIG. 6, each of the four sectors corresponds to an associated segment or section 606a, 608a, 610a, 612a of the color band 601.

The color setting interface 600 further comprises a pointer 604 which is movable on the color band 601 and is used to select the color. As shown in FIG. 6, the pointer 604 may appear on-screen as a highlighting that frames the current section 606a, 608a, 610a, 612a of the color band 601, although the pointer may instead take another form, such as a cursor displayed as an arrow.

In the color setting interface of FIG. 6, the color band 601 contains four colors, and the sectorized setting magnitude indicator 602 contains four respective portions, although more or fewer colors/portions are within the intended scope of the invention.

As in the first embodiment, the compact design of the color setting interface 600 is particularly suited to the screen of the display 420.

Unlike the first embodiment, however, the directional keys are implemented as multi-function keys. Depending upon the current state, they either move the pointer 604 in a particular direction or adjust upward/downward a setting value.

In particular, when the pointer 604 moves on the color band 601 of the color setting interface displayed as shown in FIG.

6, the controller 410 allows the pointer 604 to move according to the directional key selection signal input from the key pad 400.

When the pointer 604 does not move on the color band 601, the controller 410 perceives a location of the pointer 604 and increases or decreases the set value of the color at which the pointer 604 is located according to the directional key selection signal input from the key pad 400. In a manner similar to that of the first embodiment, when the pointer 604 is located at the lower section 606a of the color band 601, increase of the set value is not only visible from the change in color for that lower section, but, perhaps more conspicuously, by an expansion in size of the sectorized setting magnitude indicator 606b.

More generally, the second embodiment operates as follows. The controller 410 sets the current state to a color setting state when a key selection signal corresponding to the pointer moving completion key is input from the key pad 400 in a state in which the color setting interface is displayed as shown in FIG. 6.

Conversely, the controller 410 sets the current state to a pointer movable state in which the pointer is movable on the color band 601 when a key selection signal corresponding to the color setting completion key is input from the key pad 400 in a state in which the color setting interface of FIG. 6 is displayed.

The controller 410 finishes the current operation as a key selection signal corresponding to the end key is input from the key pad 400 in a state in which the color setting interface of FIG. 6 is displayed.

The storage unit 430 stores at least one color set value selected by the user.

As shown in FIG. 6, the color band 601 of the color setting interface 600 contains four colors, and the pointer 604 is located on the color section 606a of the color band. Although four sections 606a, 608a, 610a, 612a are shown, fewer or more sections are within the intended scope of the invention.

Figure 5A:
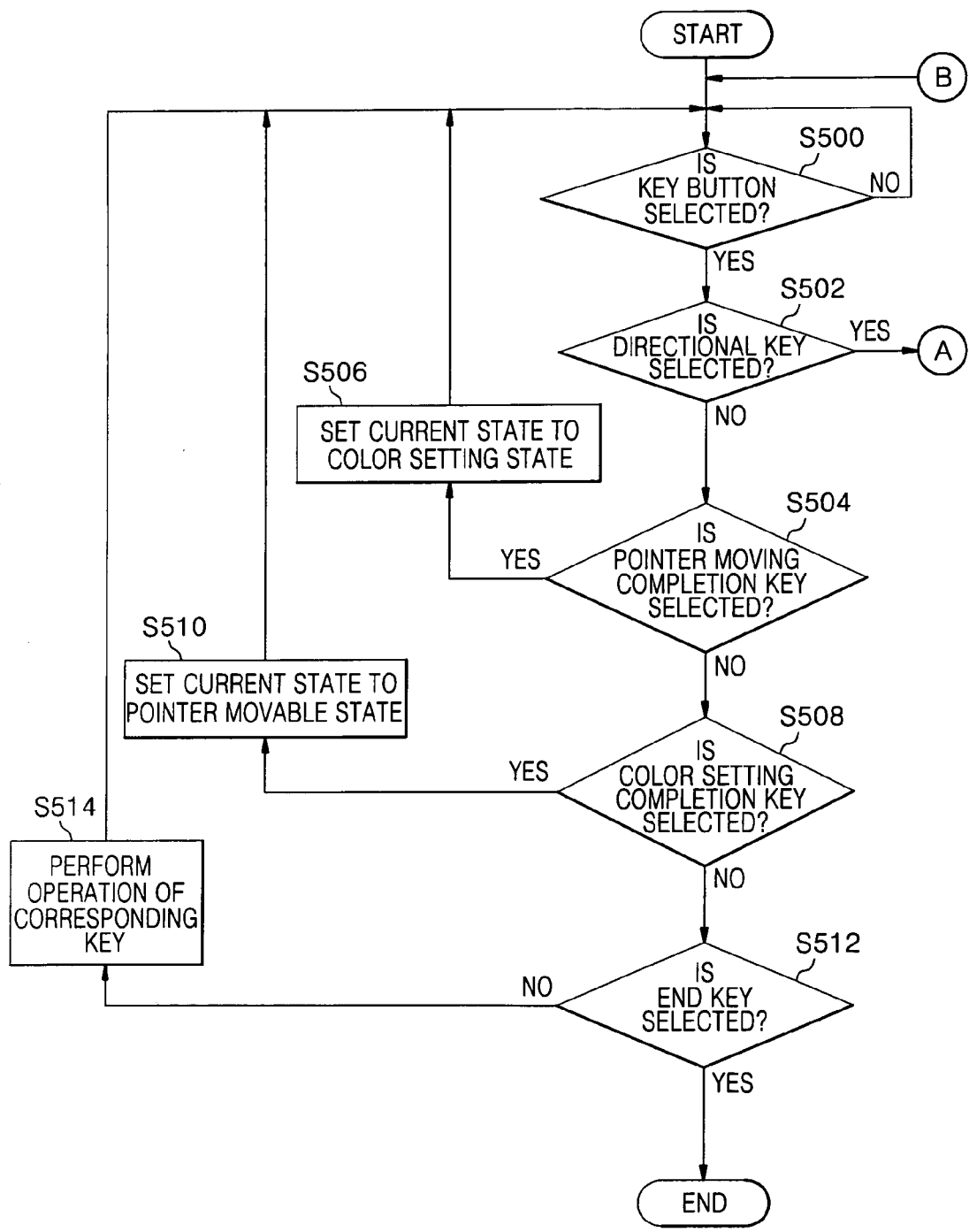
FIGS. 5A and 5B are flowcharts illustrating a color setting method of the color setting apparatus according to the second exemplary embodiment of the present invention.
Figure 5B:
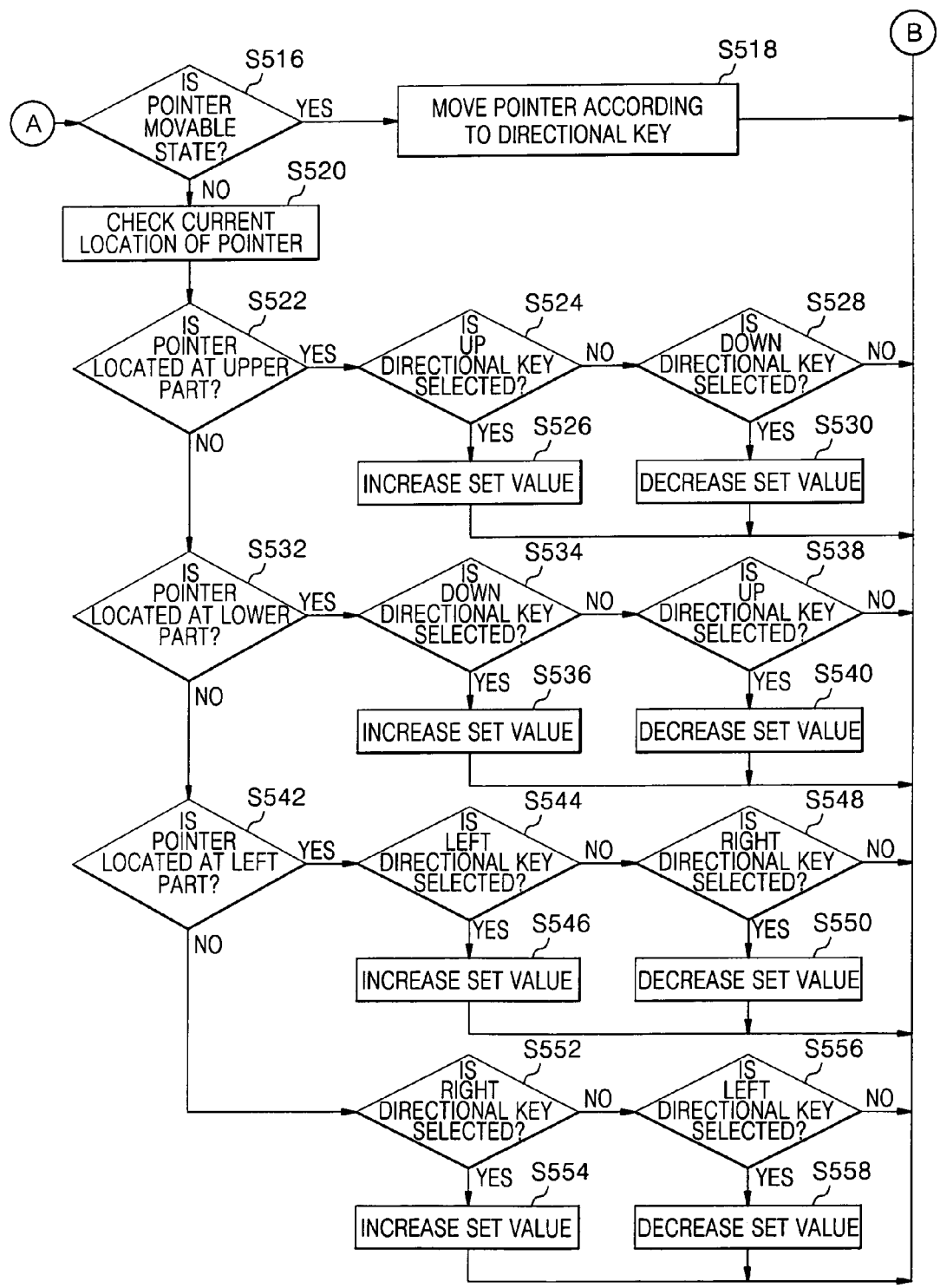

FIGS. 5A and 5B are flowcharts illustrating an example of a color setting method of the color setting apparatus 60 of the second embodiment of the present invention.

As shown in FIGS. 5A, 5B, a check is made as to whether a key is selected in a state in which the color setting interface 600 is displayed at a color setting request (S500).

When a key is selected, query is made as to whether the selected key is the directional key (S502).

If it is not the directional key, query is made on whether the selected key is the pointer moving completion key (S504).

If the selected key is pointer moving completion key, the color setting apparatus 60 goes into the color setting state for setting the color of the color band section 606a, 608a, 610a, 612a at which the pointer is current located (S506).

The selected key is not the pointer moving completion key, a check is made as to whether the selected key is the color setting completion key (S508).

If it is the color setting completion key, the color setting apparatus 60 goes into the pointer movable state in which the pointer is movable on the color band 601 (S510).

If, on the other hand, it is not the color setting completion key, the color setting apparatus 60 checks whether the selected key is the end key (S512).

When it is not the end key, the current operation that is being invoked by the user is performed (S514); however, if it is the end key, the currently performed operation finishes, i.e., halts.

If, to the contrary, a directional key is being selected (S502), query is made on whether the current states is the pointer movable state (S516).

If the current state is the pointer movable state, the pointer 604 is moved in a direction corresponding to the directional key selected (S518).

The color setting apparatus 600 checks a current location of the pointer 604 on the color band 601 when it is not in the pointer movable state (S520).

The color setting apparatus 600 checks whether the pointer 604 is located at an upper part of the color band 601 (S522).

Here, when a user looking at the screen or display 420 of the color setting apparatus 60 displaying the color setting interface 600 can see that the pointer 604 is positioned in an upper part of the color band 601, the pointer is located at the upper part of the color band.

For example, as shown in FIG. 6, when the pointer 604 is located in the section of a color 610a, it is located in the upper part of the color band 601.

The color setting apparatus 60 checks whether the up direction key is selected when the pointer is located at the upper part of the color band 601 (S524).

The color setting apparatus 60 increases and then displays the set value of the color at which the pointer 604 is located when the up directional key is selected in a state in which the pointer is located at the upper part of the color band 601 (S526). This change in set value is preferably accompanied not only by continuous transition in the color displayed in the upper part of the color band 601, but by change in size of the respective sectorized setting magnitude indicator 610b. The same visible phenomena occur in each of the below-specified cases, and will not be further described herein below.

The color setting apparatus 60 checks whether the down directional key is selected when the up directional key is not selected in a state in which the pointer is located at the upper part of the color band 601 (S528).

The color setting apparatus 60 decreases and then displays the set value of the color at which the pointer 604 is located when the down directional key is selected in a state in which the pointer is located at the upper part of the color band 601 (S530).

The above-shown logic for increasing or decreasing a set value is extended by, in the event the pointer is not located in the upper part, checking first whether it is located in the lower part (S532) and, if not located there, whether it is located in the left part (S542). If the latter check and if it is not located in the left part, the right part is assumed (S542, "NO" branch). Accordingly, the steps S524-S530 performed in the above described manner in the case of the pointer 604 being located in the upper part, are analogously performed as steps S534-S540, S544-S550, and S552-S558, correspondingly, in dependence upon where the pointer is located. In each of the four possibilities of where the pointer is located, after the respective set value adjustment routine is executed, return is made to the beginning of the process of FIG. 5A.

In particular, the color setting apparatus 60:

a) checks whether the pointer is located at a lower part of the color band when the pointer is determined to not be at the upper part of the color band in step S522 (S532);

b) checks whether the down direction key is selected when the pointer is located at the lower part of the color band (S534);

c) increases and then displays the set value of the color at which the pointer is located when the down directional key is selected in a state in which the pointer is located at the lower part of the color band (S536);

d) checks whether the up directional key is selected when the down directional key is not selected in a state in which the pointer is located at the lower part of the color band (S538);

e) decreases and then displays the set value of the color at which the pointer is located when the up directional key is selected in a state in which the pointer is located at the lower part of the color band (S540);

f) checks whether the pointer is located on the left part of the color band when the pointer is determined to not be on the lower part of the color band in step S532 (S542);

g) checks whether the left direction key is selected when the pointer is located on the left part of the color band (S544);

h) increases and then displays the set value of the color at which the pointer is located when the left directional key is selected in a state in which the pointer is located on the left part of the color band (S546);

i) checks whether the right directional key is selected when the left directional key is not selected in a state in which the pointer is located on the left part of the color band (S548);

j) decreases and then displays the set value of the color at which the pointer is located when the right directional key is selected in a state in which the pointer is located on the left part of the color band (S550).

k) when the pointer is not located on the left of the color bar, determines that the pointer is located on the right part of the color bar and checks whether the right directional key is selected (S552);

l) increases and then displays the set value of the color at which the pointer 604 is located when the right direction key is selected in a state in which the pointer is located on the right part of the color bar (S554);

m) checks whether the left directional key is selected when the right directional key is not selected in a state in which the pointer 604 is located on the right part of the color bar (S556); and n) decreases and then displays the set value of the color at which the pointer 604 is located when the left directional key is selected in a state in which the pointer is located on the right part of the color bar (S558).

As described above, the color setting apparatus and method can simultaneously select a color and adjust its set value.

While the present invention has been described with reference to exemplary embodiments thereof, it will be understood by those skilled in the art that various changes in from and detail may be made therein without departing from the scope of the present invention as defined by the following claims.

What is claimed is:

1. A color setting apparatus for a system for reproducing multimedia data, the apparatus comprising:
    a color setting interface; and
    a color setting controller for displaying on said interface:
        a closed curve band divided into at least two equal-sized sections in fixed sectors, each containing a different color having a respective set value that is adjustable to change the color; and
        a setting band having a number of setting sections, which is equal to the number of said at least two equal-sized sections, each for indicating change in a respective set values and thereby indicating an amount of color change of an associated closed curve band section,
        wherein the setting band is disposed within the closed curve band and said setting band and closed curve band are correspondingly sectorized in a fixed manner so that a given setting section resides within the same sector as its associated closed curved band section, and
        wherein the amount of color change indicated by the given setting section is represented by an increase or decrease in a size thereof in correspondence with associated adjustment in the respective set value, while the same sectorized relationship with the associated closed curve band section is maintained, and the associated closed curve band section changes color correspondingly.

2. The color setting apparatus of claim 1, wherein the color setting controller is further operative to display a reference point for color selection on a screen, to rotate the closed curve band and the setting band in a requested direction in response to a request for rotating the closed curve band and the setting band; and to change color located at the reference point corresponding to the increase or, decrease in size of the given setting band section.

3. The apparatus of claim 2, further comprising:
    a key pad which has at least one rotation key for said rotating and at least one change key to cause the color changes in response to a request to change color.

4. The color setting apparatus of claim 1, wherein the color setting controller is further operative to display a pointer that is movable on the closed curve band for color change selection of a section of the closed curve band, and to move a location of the pointer to a requested location on the closed curve band in response to a location change request.

5. The apparatus of claim 4, further comprising:
    a key pad which has:
        at least one location change key for navigating the pointer on the closed curve band; and
        at least one setting band section change key to cause the increase or decrease in size.

6. The color setting apparatus of claim 1, wherein the closed curve band comprises an outer band of a circle.

7. The color setting apparatus of claim 1, wherein the closed curve band comprises an outer band of a polygon.

8. A color setting method for a system for reproducing multimedia data, comprising the acts of:
    a) displaying:
        a closed curve band divided into at least two equal-sized sections in fixed sectors, each containing a different color and having a respective set value that is adjustable to change the color; and
        a setting band, having setting sections each for indicating change in a respective set values and thereby indicating an amount of color change in an associated closed curve band section;
        wherein the setting band is disposed within the closed curve band and said setting band and closed curve band are correspondingly sectorized in a fixed manner so that a given setting section resides within the same sector as its associated closed curved band section; and
    b) changing a set value indicated by a given setting section, the given setting section indicating the change by an increase or decrease in its size while the same sectorized relationship with the associated closed curve band section is maintained, and the associated closed curve band section changes color correspondingly.

9. The color setting method of claim 8, further comprising displaying a reference point for color selection;
    rotating the closed curve band and the setting band in a requested direction in response to a request for rotating the closed curve band and the setting band; and
    changing color located at the reference point in response to a color change request.

10. The color setting method of claim 8, further comprising:
    displaying a pointer which is movable on the closed curve band for color change selection of a section of the closed curve band; and moving a location of the pointer to a requested location on the closed curve band in response to a request for location change of the pointer.

11. The color setting method of claim 8, wherein the closed curve band comprises an outer band of a circle.

12. The color setting method of claim 8, wherein the closed curve band comprises an outer band of a polygon.

* * * * *

UNITED STATES PATENT AND TRADEMARK OFFICE
CERTIFICATE OF CORRECTION

PATENT NO. : 8,325,218 B2  
APPLICATION NO. : 11/652330  
DATED : December 4, 2012  
INVENTOR(S) : Sang-Wook Oh et al.

Page 1 of 1

It is certified that error appears in the above-identified patent and that said Letters Patent is hereby corrected as shown below:

In the Claims

Column 9, Claim 1, Lines 55-56 should read as follows: --...respective set value and thereby...--

Column 10, Claim 2, Line 9 should read as follows: --...to the increase or decrease in...--

Column 10, Claim 8, Line 39 should read as follows: --...respective set value and thereby...--

Signed and Sealed this  
Twenty-third Day of April, 2013

Teresa Stanek Rea  
*Acting Director of the United States Patent and Trademark Office*